United States Patent
Wen et al.

(10) Patent No.: US 6,819,380 B2
(45) Date of Patent: Nov. 16, 2004

(54) DOUBLE-SIDED LCD PANEL

(75) Inventors: Chi-Jain Wen, Hsinchu (TW); Dai-Liang Ting, Hsinchu (TW); Li-Sen Chuang, Penghu (TW); Shyuan-Jeng Ho, Hsinchu (TW); I-Wei Wu, Hsinchu (TW)

(73) Assignee: Toppoly Optoelectronics Corp., Miaoli (TW)

( * ) Notice: Subject to any disclaimer, the term of this patent is extended or adjusted under 35 U.S.C. 154(b) by 12 days.

(21) Appl. No.: 10/458,640

(22) Filed: Jun. 11, 2003

(65) Prior Publication Data
US 2004/0070711 A1 Apr. 15, 2004

(30) Foreign Application Priority Data
Oct. 11, 2002 (TW) ........................................ 91123421 A

(51) Int. Cl.⁷ ................................................. G02F 1/13
(52) U.S. Cl. .......................................... 349/114; 349/63
(58) Field of Search ..................................... 349/63, 114

(56) References Cited
U.S. PATENT DOCUMENTS
2004/0017529 A1 * 1/2004 Choi et al. .................. 349/114
* cited by examiner Primary Examiner—James A. Dudek
(74) Attorney, Agent, or Firm—Birch, Stewart, Kolasch & Birch, LLP

(57) ABSTRACT

A double-sided LCD panel is comprised of a transflective LCD panel and a light-emitting device. One surface of the transflective panel is used in the transparent mode, and the other surface is used in the reflective mode, achieving the goal of double-sided display. The light-emitting device may function as the front light source of the display surface in the reflective mode and the backlit source of the display surface in the transparent mode. In this manner, one can use a single panel for double screen display. This can simultaneously satisfy the requirements of light-weighted products and lowering the manufacturing cost.

10 Claims, 3 Drawing Sheets

DOUBLE-SIDED LCD PANEL

BACKGROUND OF THE INVENTION

1. Field of Invention

The invention relates to a two-screen LCD panel and, in particular, to a double-sided LCD panel that uses a single panel to implement dual display.

2. Related Art

Among so many electronic devices, having a light weight and a compact size becomes the primary concern for planar displays. In addition to the continuous improvement in the reaction speed, resolution, and screen quality of the displays, engineers also pursue for breakthroughs in functions and display modes. For example, the market is recently advertising the dual display mode function in consumer electronics. That is, the screen is simultaneously sent to two output devices (such as CRT screens and LCD panels). This method does not only extend the screen space to a wilder view field, it can also function as a real-time monitoring system for quickly job switching and processing more work.

Since the LCD panel has become the main power on the display market. Therefore, how to make an electronic system simultaneously drive two output devices through a circuit design has been the main research topic of all manufacturers. However, most dual display systems use two independent liquid crystal displays (LCD's) to make a set of dual display. This method requires twice as much cost and space as a single LCD. Moreover, it does not satisfy the need for lightness and compactness. Consequently, developing a better dual display is an important subject.

In terms of the modern LCD technology, the reflective LCD's include the reflective type and the transflective type. The former does not need a backlit source. It utilizes a reflective plate attached on the LCD panel to reflect external light. Its advantage is being very power-effective (only a small fraction of the transparent LCD's). Its drawback, however, is that the screen is not easy to view in a dimmer environment and has a worse contrast. Therefore, it normally uses a front light source as the auxiliary light source. Nevertheless, the contrast and brightness of a purely reflective type LCD are greatly reduced when the environment is not bright enough. The purely transparent type LCD usually has an insufficient contrast when the environment is too bright. Therefore, it would be better if one can combine the auxiliary backlit source and the transparent technology to form the transflective LCD that has the advantages of both the transparent and reflective LCD's. When the external light is sufficient, the transflective type display uses the external light. When the external light is too dim, the backlit source is turned on. Therefore, this is a wonderful solution of saving energy and providing auxiliary light. Currently, how to combine existing display technologies to make dual display monitors is an important issue in the industry, but is nonetheless seldom studied.

SUMMARY OF THE INVENTION

To achieve the above-mentioned objective, the invention uses a transflective LCD panel along with a light-emitting device to make a dual display LCD panel. One surface of the transflective panel uses the transparent mode for display, while the other surface uses the reflective mode. At the same time, the LCD panel in the transparent mode uses the light-emitting device as a backlit source. The reflective mode uses the light-emitting device as the front light source only when the environment is dark.

The disclosed double-sided LCD includes a transflective display panel, which is comprised of a first transparent substrate, a second transparent substrate, several electrodes, a partial reflective layer, and a liquid crystal material. A space is inserted between the first transparent substrate and the second transparent substrate. The liquid crystal material fills up this space. The electrodes are formed on the first transparent substrate and the second transparent substrate for imposing a voltage on the liquid crystal material. The partial reflective layer is formed on the surface of the second transparent substrate for allowing part of the incident light to be reflected by the reflective layer and to go out through the first transparent substrate. This forms a reflective display panel. The rest of the incident light penetrates through the reflective layer and comes out from the second transparent substrate, forming a transparent display panel. A light-emitting device is provided at the interface between the first transparent substrate and the external environment for providing the incident light. It simultaneously functions as the front light source of the reflective display panel and the backlit source of the transparent display panel. The light-emitting device can be made of a light source and a light-guiding plate. The light-guiding plate is put at one side of the reflective display panel. The light source emits light toward the light-guiding plate for providing a homogeneous incident beam of light.

In addition, the invention further contains several thin film transistors (TFT's) for controlling the electrodes and the voltage they impose on the liquid crystal material. The invention may also contain a polarizer and a phase-difference wavelength plate attached on the reflective display panel and the transparent display panel, respectively, for blocking unnecessary incident and environmental light. At the same time, to increase the contrast and image quality of the transparent display panel, an anti-reflective (AR) mask can be formed on the sides of the transparent display panel.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
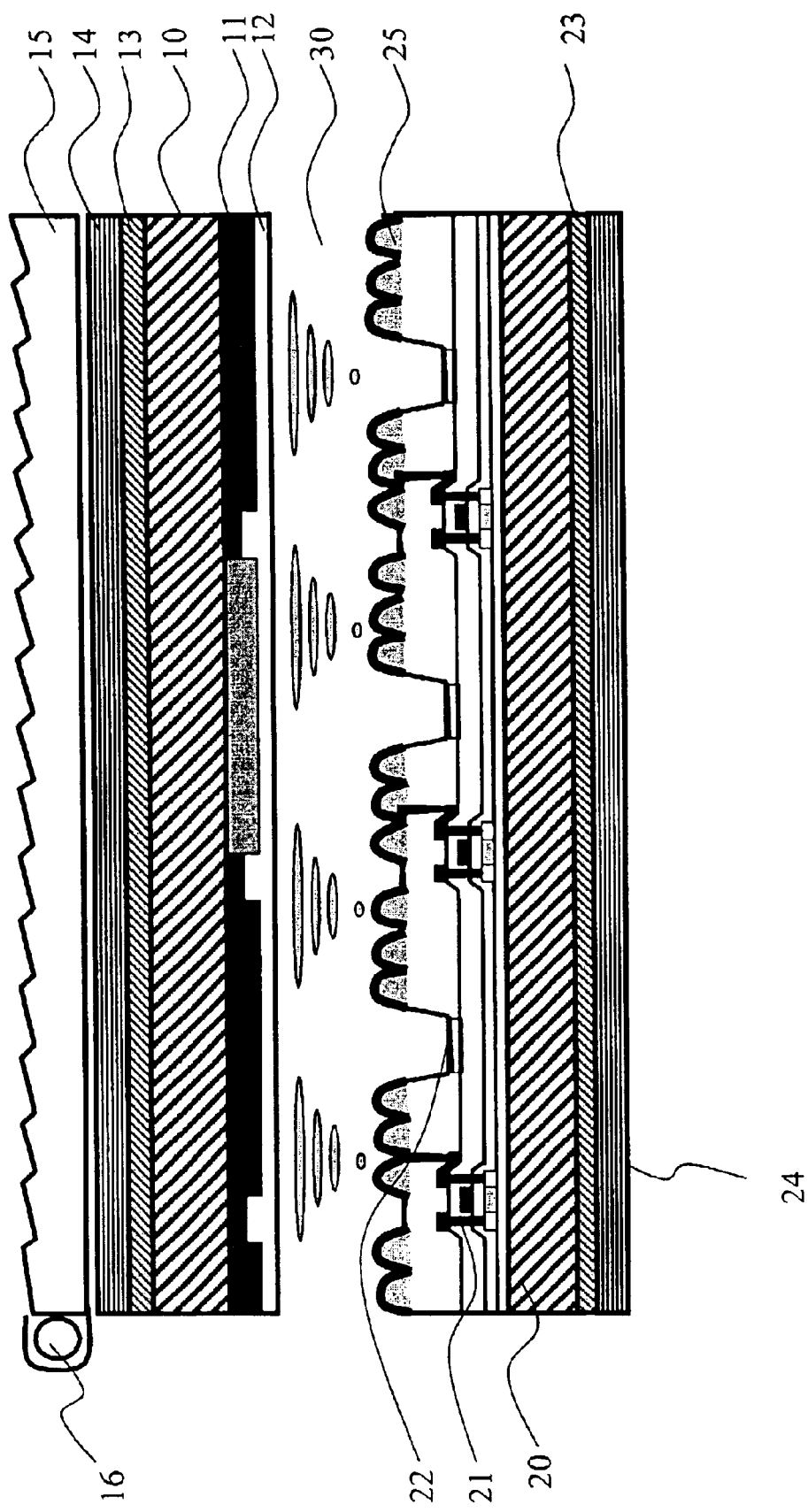
FIG. 1 is a schematic view of the double-sided LCD panel according to a first embodiment of the invention.

This specification discloses a double-sided liquid crystal display (LCD) panel, which combines a transflective display panel and a light-emitting device to achieve the objective of dual display. For detailed description of the dual display mode, please refer to FIG. 1 that shows a first embodiment of the invention. In this embodiment, the double-sided LCD panel contains a transflective display panel and a light-emitting device. As shown in the drawing, the transflective display panel consists of a reflective display panel part, a transparent display panel part, and a liquid crystal material 30. The reflective display panel is comprised of, from outside to inside, a first polarizer 14, a first wide-frequency quarter-wavelength plate 13, a first transparent substrate 10, a color filter 11, and a transparent electrode 12. The transparent display panel is comprised of, from outside to inside, a first polarizer 24, a first wide-frequency quarter-wavelength plate 23, a first transparent substrate 20, a thin film transistor (TFT) 21, a transparent electrode 22, and a partial reflective layer 25. A container space is inserted between the reflective display panel and the transparent display panel, with the liquid crystal material 30 filled therein. The light-emitting device is made of a light source 16 and a light-guiding plate 15. The light-guiding plate 15 is placed by the side of the reflective display panel. The light source 16 sends a beam of light toward the light-guiding plate 15 so that the light-guiding plate 15 provides a homogeneous incident beam of light. The light-emitting device simultaneously functions as the front light source of the reflective display panel and the backlit source of the transparent display panel.

The TFT is used to control the voltage imposed on the liquid crystal material, modulating the light flux and the color generated by the color filter. The polarizer and the wide-frequency quarter-wavelength plate are used to cut unnecessary incident and environmental light.

Figure 2:
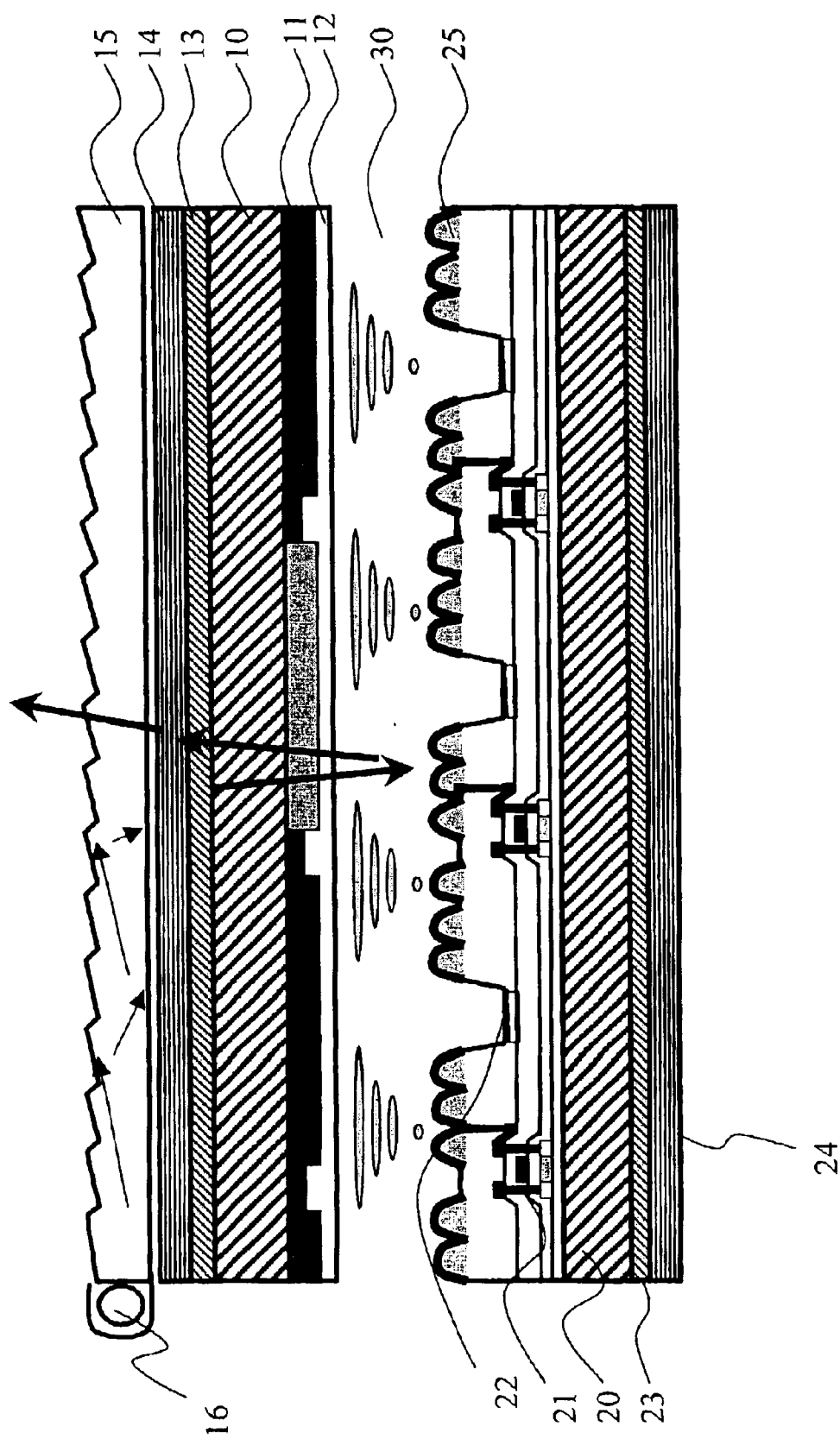
FIG. 2 is a schematic view of the display mode of the reflective display panel in FIG. 1.
Figure 3:
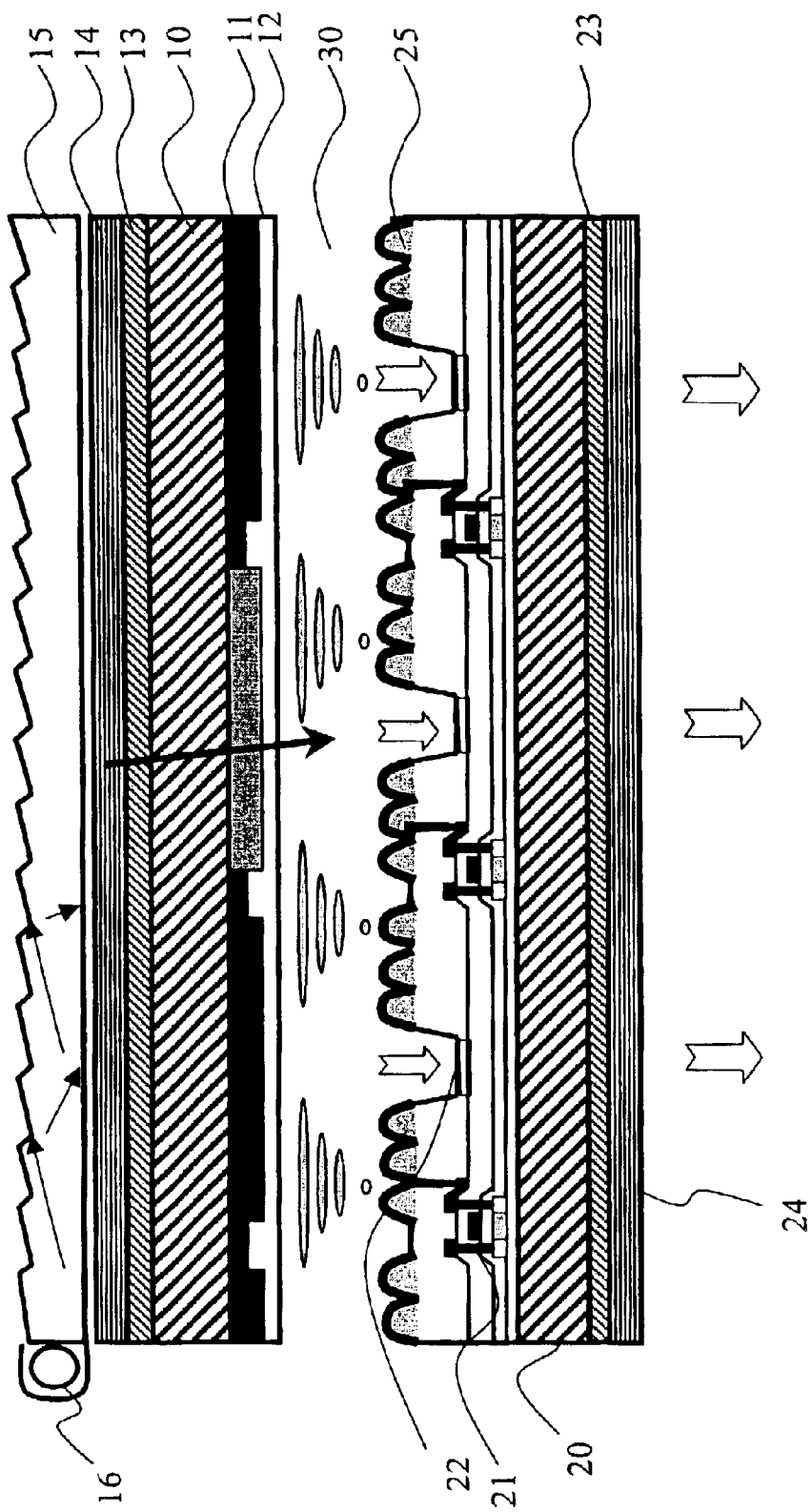
FIG. 3 is a schematic view of the display mode of the transparent display panel in FIG. 1.

The display mode of the reflective display panel in the embodiment is shown in FIG. 2. The incident light is provided by the environment or the light-emitting device. After passing through the reflective display panel 25 and the liquid crystal material 30, the incident light is reflected by the partial reflective film and goes out through the first transparent substrate 10. The outgoing light flux and color are controlled through the modulation of the TFT 21. Please refer to FIG. 3 for the display mode of the transparent display panel. The light-emitting device is used as the backlit source of the transparent display panel. As shown in the drawing, after the incident light passes through the reflective display panel and the liquid crystal material 30, part of the incident light goes out via the transparent electrode 22 and the second transparent substrate 20. As in the previous case, the outgoing light flux and color are controlled through the modulation of the TFT 21.

To enhance the contrast and image quality of the transparent display panel, one can form an anti-reflective (AR) mask on the sides of the transparent display panel. This can reduce undesired light reflected from the TFT 21 and metal signal lines in the LCD panel. The AR mask can be a specially processed black matrix. It can be formed on the surface of the second transparent substrate or be inserted into any layer in the TFT structure. The black matrix can be formed from black resin or $Cr/CrO_X$ chemicals.

Effects of the Invention

The invention combines a transflective display panel and a light-emitting device to form a double-sided LCD panel. Since it only requires a single panel for dual display, the invention can be a light, compact two-screen display for wide applications in portable products. It can save the manufacturing cost because the dual display mode can use the same driver circuit. Under different use states, one only needs to flip the display screen of the main display panel.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A double-sided liquid crystal display (LCD) panel, which comprises:
    a transflective display panel, including:
        a first transparent substrate, which allows a beam of light to come in and go out and functions as a reflective display panel;
        a second transparent substrate, which functions as a transparent display panel, wherein a container space is inserted between the second transparent substrate and the first transparent substrate;
        a liquid crystal material, which fills the container space, wherein a voltage is imposed to control light that passes through the liquid crystal material;
        a plurality of electrodes formed on the first transparent substrate and the second transparent substrate for imposing a voltage on the liquid crystal material;
        a partial reflective layer, which is formed on a surface of the second transparent substrate to allow part of incident light to be reflected and go out through the first transparent substrate while the rest of the incident light to penetrate through the partial reflective layer and go out through the second transparent substrate; and
        a light-emitting device, which is installed on one side of the first transparent substrate to provide the incident light and functions as a front light source of the reflective display panel and a backlit source of the transparent display panel when the environment is dark.

2. The double-sided LCD panel of claim 1, wherein the light-emitting device is comprised of a light source and a light-guiding plate, the light-guiding plate being disposed on one side of the first transparent substrate, the light source sending a beam of light to the light-guiding plate to reflect and provide homogeneous incident light.

3. The double-sided LCD panel of claim 1 further comprising a plurality of thin film transistors (TFT's) for controlling the plurality of electrodes and the voltage they impose on the liquid crystal material.

4. The double-sided LCD panel of claim 1, wherein the reflective display panel contains a polarizer and a phase-difference wavelength plate for blocking unnecessary incident light and environmental light.

5. The double-sided LCD panel of claim 1, wherein the transparent display panel contains a polarizer and a phase-difference wavelength plate for blocking unnecessary incident light and environmental light.

6. The double-sided LCD panel of claim 1, wherein the transparent display panel contains an anti-reflective (AR) mask for enhancing the contrast and image quality of the transparent display panel.

7. The double-sided LCD panel of claim 1, wherein the AR mask is a black matrix.

8. The double-sided LCD panel of claim 7, wherein the black matrix is made of a material selected from black resin and $Cr/CrO_X$.

9. The double-sided LCD panel of claim 7, wherein the black matrix is formed on a surface of the second transparent substrate.

10. The double-sided LCD panel of claim 7, wherein the black matrix is a layer in the layered TFT's.

* * * * *